US011527162B2

(12) United States Patent
Bruhn

(10) Patent No.: US 11,527,162 B2
(45) Date of Patent: Dec. 13, 2022

(54) NETWORKED USAGE TRACKING FOR DOCKLESS PERSONAL TRANSPORT VEHICLES

(71) Applicant: DISH Network L.L.C., Englewood, CO (US)

(72) Inventor: Chris Bruhn, Aurora, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 17/350,249

(22) Filed: Jun. 17, 2021

(65) Prior Publication Data

US 2021/0375140 A1    Dec. 2, 2021

Related U.S. Application Data

(63) Continuation of application No. 16/211,172, filed on Dec. 5, 2018, now Pat. No. 11,081,009.

(51) Int. Cl.
| | | |
|---|---|---|
| *G08G 1/00* | (2006.01) | |
| *H04W 4/029* | (2018.01) | |
| *G06V 20/10* | (2022.01) | |
| *H04W 88/02* | (2009.01) | |
| *B60R 25/24* | (2013.01) | |

(52) U.S. Cl.
CPC .............. *G08G 1/20* (2013.01); *G06V 20/10* (2022.01); *H04W 4/029* (2018.02); *B60R 25/24* (2013.01); *B60R 2325/205* (2013.01); *H04W 88/02* (2013.01)

(58) Field of Classification Search
CPC .......... G08G 1/20; G08G 1/205; G06V 20/10; G06V 20/56; H04W 4/029; H04W 4/42; H04W 4/44; H04W 88/02; B60R 25/24; B60R 2325/205
See application file for complete search history.

(56) References Cited

U.S. PATENT DOCUMENTS

| | | | |
|---|---|---|---|
| 5,289,369 A | 2/1994 | Hirshberg | |
| 7,123,166 B1 | 10/2006 | Haynes et al. | |
| 11,081,009 B2 | 8/2021 | Bruhn | |
| 2008/0037504 A1 | 2/2008 | Jeon et al. | |

(Continued)

FOREIGN PATENT DOCUMENTS

CN          107452204 A  * 12/2017  ............. G08G 1/205

*Primary Examiner* — Farid Seyedvosoghi
(74) *Attorney, Agent, or Firm* — Kilpatrick Townsend & Stockton LLP

(57) ABSTRACT

Novel techniques are described for usage tracking for shared dockless personal transport vehicles (PTVs) over one or more communications networks. Features encourage desired interactions between consumers and PTVs, such as by encouraging consumers to park the PTVs in a desirable condition and in desirable locations. For example, embodiments obtain location data from at least one sensor (e.g., a camera of a smart phone) indicating a parked location of a PTV of a fleet of shared PTVs. A set of parked location attributes is computed in accordance with the obtained location data, and an arbitration determination is computed indicating whether the set of parked location attributes meets a stored set of acceptance criteria. In accordance with a favorable computed arbitration determination, embodiments can output lock control data for a vehicle lock of the PTV (e.g., to lock the PTV in its parked location).

18 Claims, 4 Drawing Sheets

(56) References Cited

U.S. PATENT DOCUMENTS

| | | |
|---|---|---|
| 2018/0154867 A1 | 6/2018 | Golduber |
| 2018/0285657 A1 | 10/2018 | Koreishi |
| 2018/0286237 A1* | 10/2018 | Hu .................... G08G 1/146 |
| 2018/0354571 A1 | 12/2018 | Xie et al. |
| 2019/0311630 A1 | 10/2019 | VanderZanden et al. |
| 2019/0324446 A1* | 10/2019 | VanderZanden ..... G05D 1/0291 |

* cited by examiner

NETWORKED USAGE TRACKING FOR DOCKLESS PERSONAL TRANSPORT VEHICLES

CROSS-REFERENCES TO RELATED APPLICATIONS

This application is a continuation of U.S. patent application Ser. No. 16/211,172, filed on Dec. 5, 2018, entitled "Networked Usage Tracking For Dockless Personal Transport Vehicles," the disclosure of which is hereby incorporated by reference in its for all purposes.

FIELD

This invention relates generally to shared personal transport vehicles, and, more particularly, to usage tracking for shared dockless personal transport vehicles using narrowband Internet-of-Things networks.

BACKGROUND

The convenience of owning a vehicle can often be overshadowed by a number of costs (e.g., purchase, fuel, parking, maintenance, etc.) and other frustrations. Over time, a number of categories of alternatives have become available. One category includes buses, trains, and other forms of public transportation. While public transportation can be relatively inexpensive and convenient for some people in some places, use of public transportation options can often be frustrated by limited schedules, limited routes, inconvenient stations, long wait times, etc. Another category of such alternatives involves taxis, car services, or ridesharing services; but the cost and convenience can often be highly dependent on traffic and availability.

Another category of such alternatives involves docked personal transport vehicles, such as non-electric bicycles, electric bicycles, and electric scooters. Typically, a docking station is installed in a particular location, and the docking station may include a number of docks into which the personal transport vehicles can be parked. A consumers can pay (e.g., at a pay station or via a smart phone application) on a usage and/or subscription basis, allowing the consumer to undock (unlock and remove from the dock) the personal transport vehicle for use, and to re-dock (park in the dock and re-lock) the personal transport vehicles after use. Such docked personal transport vehicles can provide consumers with access, speed, and other conveniences of a personal transport vehicle; without the consumer having to purchase a personal transport vehicle, to pay for maintenance or parking, etc. A significant downside to docked personal transport vehicles is convenience. Installation of docking stations tends to involve appreciable space, logistics, expense, such that availability of docking stations tends to be limited. Accordingly, it is common for the pickup and/or drop-off location of docked personal transport vehicles to be inconvenient to consumers, which tends to appreciably limit their use and desirability.

In recent years, so-called "dockless" personal transport vehicle services have begun to be offered in an effort to address some of the limitations of docked transport vehicle services. Dockless personal transport vehicle services are typically similar to their docked counterparts, except that there are no docking stations; personal transport vehicles can be parked by one consumer in a location convenient to that consumer, and subsequently retrieved from that location by a next consumer. For example, a consumer can use a smart phone application, or the like, to discover a location of an available one of the personal transport vehicles. When in proximity to the available personal transport vehicle, the consumer can use the smart phone application to request use of the personal transport vehicle, to remit payment for use of the personal transport vehicle, and to receive an unlock code to enable use of the personal transport vehicle. While dockless personal transport vehicle services can provide increased convenience to consumers, certain concerns have tended to limit the availability and desirability of such services. For example, consumers often park the personal transport vehicles in undesirable locations, such as laid down in the middle of a sidewalk, or in a location that is generally inconvenient to other consumers.

BRIEF SUMMARY

Among other things, embodiments provide novel systems and methods for usage tracking for shared dockless personal transport vehicles (PTVs) over one or more communications networks. Various technical features encourage interactions between consumers and PTVs that are desirable to the providers of dockless PTV services, such as by encouraging consumers to park the PTVs in a desirable condition and in desirable locations. For example, embodiments obtain location data from at least one sensor (e.g., a camera of a smart phone) indicating a parked location of a PTV of a fleet of shared PTVs. A set of parked location attributes is computed in accordance with the obtained location data, and an arbitration determination is computed indicating whether the set of parked location attributes meets a stored set of acceptance criteria. In accordance with a favorable computed arbitration determination, embodiments can output lock control data for a vehicle lock of the PTV (e.g., to lock the PTV in its parked location).

According to one set of embodiments, a usage tracking system is provided for shared dockless PTVs. The system includes: a location capture device to obtain location data from at least one sensor indicating a parked location of a PTV of a fleet of shared PTVs; a location characterization processor in communication with the location capture device to compute a set of parked location attributes in accordance with the location data; a non-transient data store having stored thereon a set of acceptance criteria; a parking arbitration processor in communication with the location characterization processor to compute an arbitration determination indicating whether the set of parked location attributes meets the set of acceptance criteria; and a lock control processor to communicate lock control data for a vehicle lock coupled with the personal transport vehicle in response to the arbitration determination indicating that the set of parked location attributes meets the set of acceptance criteria.

According to another set of embodiments, a method is provided for usage tracking for shared dockless PTVs. The method includes: obtaining location data from at least one sensor indicating a parked location of a PTV of a fleet of shared PTVs; computing a set of parked location attributes in accordance with the location data; computing an arbitration determination indicating whether the set of parked location attributes meets a stored set of acceptance criteria; and communicating lock control data for a vehicle lock coupled with the personal transport vehicle in response to the arbitration determination indicating that the set of parked location attributes meets the set of acceptance criteria.

According to another set of embodiments, another usage tracking system is provided for shared dockless PTVs. The system includes one or more processors and a memory. The memory is communicatively coupled with, and readable by, the one or more processors and has stored thereon processor-readable instructions. When the instructions are executed by the one or more processors, the one or more processors are caused to: obtain location data from at least one sensor indicating a parked location of a PTV of a fleet of shared PTVs; compute a set of parked location attributes in accordance with the location data; compute an arbitration determination indicating whether the set of parked location attributes meets a stored set of acceptance criteria; and output lock control data for a vehicle lock coupled with the personal transport vehicle in response to the arbitration determination indicating that the set of parked location attributes meets the set of acceptance criteria.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
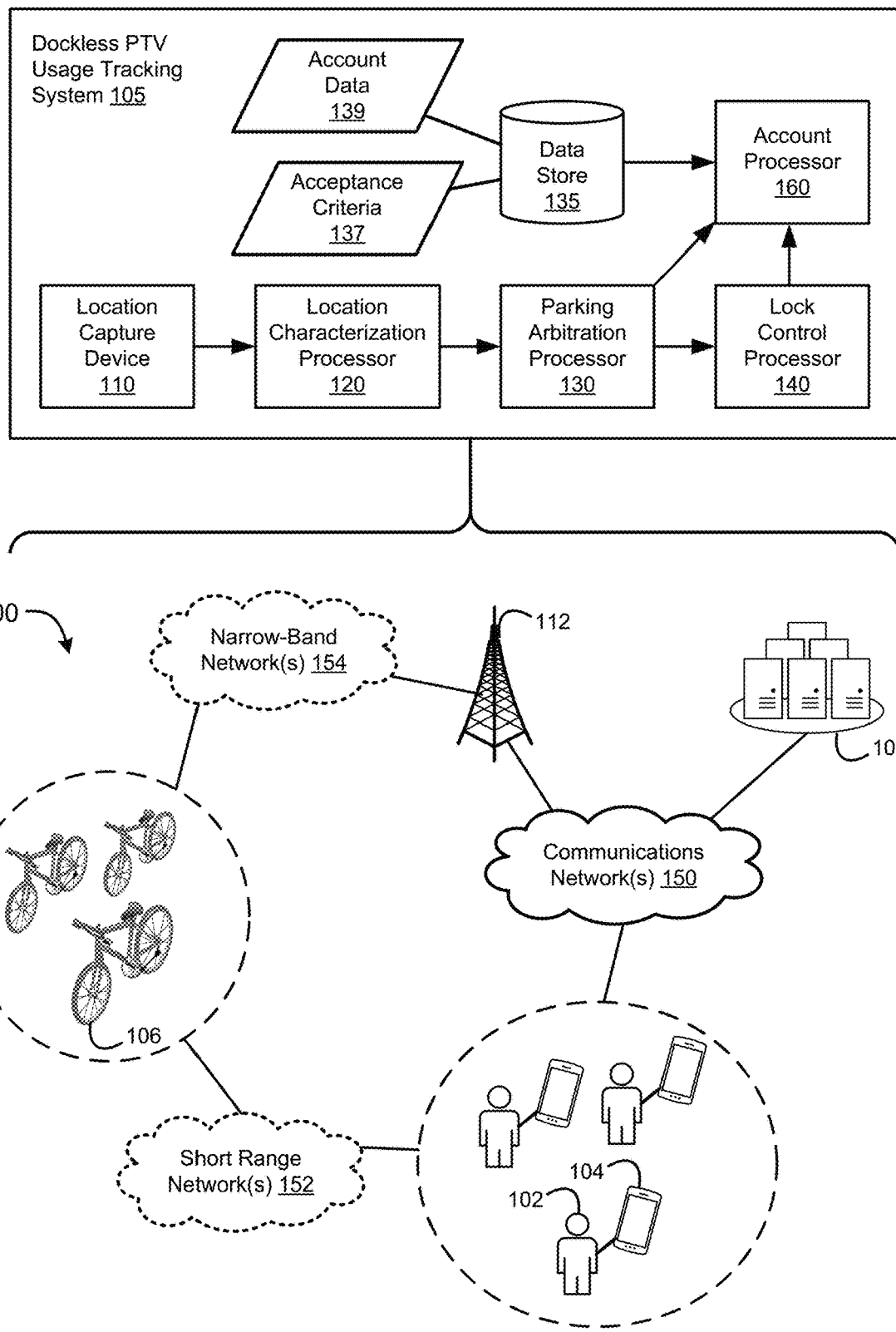
FIG. 1 shows an embodiment of a dockless PTV usage tracking system implemented in context of a networked usage tracking environment, according to various embodiments.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Many areas, such as areas having large numbers of corporate and/or school commuters, have seen an appreciable rise in availability and popularity of alternate transportation options. In recent years, some of those options have begun to includes services to facilitate shared access to personal transport vehicles (PTVs), such as bicycles and scooters. Some such services rely on docking locations from which the PTVs must be checked out, and to which the PTVs must be returned. Use of docking stations has certain benefits to service providers, municipalities, etc. For example, the docking stations can provide secure locking and unlocking of the PTVs, secure payment and account processing, and relatively simple inventory and maintenance tracking and management (e.g., by having a limited number of location to which personnel are dispatched for checking, servicing, replacing, and/or otherwise interacting with PTV inventory). Further, use of docking stations can help assure service providers, municipalities, and the like, that the PTVs will be parked in acceptable locations (e.g., in safe areas, in compliance with traffic and other regulations, etc.). However, reliance on docking stations can also cause certain limitations. For example, installation of docking stations can tend to involve appreciable space, logistics, and expense, such that availability of docking stations to consumers tends to be limited. Accordingly, it is common for the pickup and/or drop-off location of docked personal transport vehicles to be inconvenient to consumers, thereby appreciably limiting use and desirability of such docked PTV services.

More recently, so-called "dockless" PTV services have begun to be offered in an effort to address some of the limitations of docked transport vehicle services. Dockless personal transport vehicle services are typically similar to their docked counterparts, except that there are no docking stations; PTVs can be parked by one consumer in any location convenient to that consumer, and subsequently retrieved from that location by a next consumer. For example, a consumer can use a smart phone application, or the like, to discover a location of an available PTV. When in proximity to the available PTV, the consumer can use the smart phone application to request use of the PTV, and to receive an unlock code to enable use of the personal transport vehicle. When the consumer is finished using the PTV, the consumer can use the smart phone application to indicate completion of use, to remit payment for use of the PTV, and to receive a lock code with which to securely park and lock the PTV. While dockless PTV services are typically more convenient to consumers than their docked counterparts, certain concerns have tended to limit the availability and desirability of such services. For example, consumers often park the PTVs in undesirable locations, such as laid down in the middle of a sidewalk, or in a location that is generally inconvenient to other consumers.

Embodiments described herein seek to address some of the concerns that have tended to limit the availability and desirability of dockless PTV services. Some embodiments include novel techniques for obtaining data relating to a location in which a PTV has been parked and computing the attributes of the parked location and the acceptability of the parked location based on particular criteria. Embodiments can also communicate locking control data with which to lock the parked PTV in its locking location, and/or compute consumer account updates, in accordance with the acceptability of the parked location.

FIG. 1 shows an embodiment of a dockless PTV usage tracking system 105 implemented in context of a networked usage tracking environment 100, according to various embodiments. The usage tracking environment 100 has a number of networked nodes, including a number of PTVs 106, a number of consumer mobile devices 104 (associated with respective consumers 102), and one or more back-end computational systems 108. The PTVs 106 can include any suitable type of transport vehicle, including any vehicle that is motorized, non-motorized, or partially motorized; autonomous, non-autonomous, or partially autonomous; for carrying one, or a small number, of passengers; etc. For example, the PTVs 106 can include bicycles, scooters, motorcycles, cars, skateboards, etc. In some instances, the PTVs 106 can include other types of shared vehicles, such as construction equipment shared by multiple user on a construction site, service equipment used by multiple service personnel (e.g., food service carts, maintenance or janitorial carts, etc.). The consumer mobile devices 104 can include any suitable mobile computational device that includes one or more processors, one or more input/output components (e.g., display, camera, touchscreen, etc.), and one or more antennas for wireless communication via one or more network types. For example, the consumer mobile devices 104 can include smart phones, tablet or laptop computers, smart watches or other wearables, etc. The back-end computational system(s) 108 can be implemented as one or more server computers, or the like, that is in accessible via one or more networks and may or may not be distributed across multiple locations and/or physical computational devices. For example, the back-end computational system(s) 108 can be a cloud-based server having suitable processing and storage capacity (e.g., fixed or dynamic) for executing suitable applications, as described herein.

In some embodiments, each consumer mobile device 104 is in communication with the back-end computational system(s) 108 via one or more communications network(s) 150. Typically, such communications involve at least one wireless link. The communications network(s) 150 can include any suitable wired or wireless network links and any suitable network types and/or architectures, such as public and/or private networks, cellular networks, satellite networks, cable networks, fiber-optic networks, backhaul networks, etc. In some embodiments, the consumer mobile devices 104 communicate with the back-end computational system(s) 108 using conventional Internet network links, protocols, etc.

In some embodiments, each PTV 106 is in communication with the back-end computational system(s) 108 via one or more narrow-band networks 154, such as a narrow-band Internet of Things (NB-IoT) network, a low-power wide area network (LPWAN), a long-range wide area network (LoRaWAN), a cellular IoT network (e.g., Long Term Evolution (4G), category M, or "LTE CAT-M"), etc. In some implementations, the communications network(s) 150 include the narrow-band network(s) 154. In other implementations, the narrow-band networks 154 are in communication with the communications network(s) 150, for example, via one or more radio towers 112, or the like. Typically, such communications involve at least one wireless link. For example, each of the PTVs 106 (or a portion of the PTVs 106) can have a radio transceiver installed thereon (e.g., in a secure, tamper-resistant, and theft-resistant manner), and the back-end computational system(s) 108 can be in communication with the radio transceivers of the PTVs 106.

In some embodiments, some or all of the consumer mobile devices 104 can communicate with some or all of the PTVs 106 via one or more short-range networks 152. For example, the short-range networks 152 can include any suitable short-range wireless, or contact-based communications links using any suitable type of antennas, protocols, etc., such as those using Near Field Communication (NFC), Bluetooth, Zigbee, IEEE 802.11 (WiFi), etc. In some implementations, the communications network(s) 150 include the short-range network(s) 152. As one example, a consumer mobile device 104 can communicate with a PTV 106 via the Internet or other separate network with which they are each independently in communication, such as using an Internet portal application, text messaging, etc. As another example, a consumer mobile device 104 can communicate with a PTV 106 via the back-end computational system(s) 108, such as by using the back-end computational system(s) 108 to relay and/or translate messages between the nodes, by using the back-end computational system(s) 108 as a proxy for one or more of the nodes, etc. In other implementations, the short-range network(s) 152 are independent of the communications network(s) 150, such that the consumer mobile devices 104 can communicate directly with the PTVs 106 via the short-range networks 152. As one example, a consumer mobile device 104 can pair with a nearby, available PTV 106 using a Bluetooth antenna and Bluetooth protocols, or the like. As another example, a consumer mobile device 104 can communicate with a PTV 106 via contact, or very short-range non-contact, components and protocols, such as NFC, radio-frequency identification (RFID), etc.

For the sake of the description herein, it is generally assumed that the PTVs 106 are part of a fleet of shared PTVs 106 provided by one or more dockless PTV service provider. For example, a service provider in a particular city may own a fleet of hundreds of bicycles and scooters distributed around the city. Consumers 102 can subscribe to one or more dockless PTV services offered by the one or more service providers, and/or consumers 102 can interact with the services in any suitable manner (e.g., by paying per use, buying credits for multiple uses, etc.). A typical transaction between a consumer 102 and a PTV 106 can involve three phases: a PTV check-out phase, a PTV use phase, and a PTV check-in phase. In the PTV check-out phase, a consumer 102 desiring to use one of the PTVs 106 can begin the transaction by finding an available PTV 106 (e.g., by personally spotting an available one in a parked location, by using an application to obtain location information, etc.), and using an application (e.g., on a consumer mobile device 104) to check out (e.g., rent, release, etc.) the PTV 106. In some cases, checking out the PTV 106 can involve providing payment, pre-authorization of payment, or the like. Further, in some cases, checking out the PTV 106 can involve causing the PTV 106 to be physically unlocked, for example, by the service provider remotely unlocking an electronic vehicle lock, by the consumer 102 receiving and entering a lock code to electronically and/or manually unlock the vehicle lock, etc. In the PTV use phase, the consumer 102 can use the checked-out PTV 106, for example, by riding and/or driving the PTV 106 to a desired location. In the PTV check-in phase, when the consumer 102 is done using the PTV 106, the consumer 102 can end the transaction. For example, ending the transaction can end the consumer's 102 responsibility with respect to the PTV 106 (e.g., to avoid incurring charges for subsequent use of the PTV 106 by others, to cease being responsible for subsequent damage to the PTV by others, etc.). Ending the transaction can involve re-parking the PTV 106, re-locking the PTV 106, and making any suitable account adjustments, or the like (e.g., remitting or adjusting payment, logging the consumer's 102 use and/or related data, updating PTV 106 inventory, etc.).

Embodiments described herein are generally concerned with the PTV check-in phase, in which one or more consumers 102 desire to end one or more transactions relating to one or more PTVs 106. Though this is the focus of the described embodiments, it will be appreciated that such embodiment can operate in context of more holistic implementations that include services and functions relating to beginning transactions between consumers 102 and PTVs 106, use of PTVs 106 by consumers 102, interactions between consumers 102 and account features, PTV inventory management, and/or other aspects of dockless PTV services. In support of the PTV check-in phase, embodiments of the networked usage tracking environment 100 implement the dockless PTV usage tracking system 105.

The dockless PTV usage tracking system 105 can include some or all of a data store 135, a location capture device 110, a location characterization processor 120, a parking arbitration processor 130, a lock control processor 140, and an account processor 160. Embodiments of the location capture device 110 can obtain location data from at least one sensor indicating a parked location of one of the PTVs 106 of a fleet of shared PTVs 106. The captured location data can indicate where a particular PTV 106 is parked in relation to geospatial coordinates, mapping data (e.g., a street map), or the like. In some implementations, the location data can indicate information about the immediate surroundings of the PTV 106, such as one or more images of the environment (e.g., the sidewalk, etc.) in which the PTV 106 is parked. In some implementations, the location data can indicate information about the state of the PTV 106, such as its orientation (e.g., whether it is parked upright or laying down, in which direction the PTV 106 is facing, etc.), its condition (e.g., whether it appears to be dirty, broken, etc.), and/or other such information.

The location data can be obtained by the location capture device 110 in any suitable manner using any suitable type of sensor. In some embodiments, the location capture device 110 includes one or more cameras that can capture one or more images of the PTV 106 in its parked location and condition. For example, the location capture device 110 can be implemented by a consumer mobile device 104 (e.g., a smart phone) that has a built-in camera, and a consumer 102 can use the camera of the consumer mobile device 104 to take pictures of the PTV 106 after it is parked. In some implementations, a dedicated application is running on the consumer mobile device 104 that is associated with a dockless PTV service, and the images are captured within the dedicated application as part of a check-in process. In some such implementations, the application includes user interface instructions, or the like, to instruct or guide the consumer 102 as to which images to capture. In other implementations, one or more cameras can be integrated with (e.g., coupled to, built into, etc.) the PTV 106. For example, during a check-in process, the PTV 106 can capture images of its surroundings. In other implementations, where applicable, cameras in the environment can be exploited. For example, a PTV 106 parked in a city, or a PTV 106 parked in a construction site, may be in sight of one or more closed-circuit security or traffic cameras, etc. In other embodiments, the location capture device 110 includes one or more GPS sensors that can capture geospatial data, such as geospatial coordinates. In some implementations, a PTV 106 can have integrated GPS components (e.g., a GPS sensor, processor, etc.) that can detect its location. In other implementations, a consumer mobile device 104 can include GPS components to determine a location of the consumer mobile device 104. In other embodiments, the location capture device 110 includes one or more other types of sensors by which to obtain the location data. In some implementations, a consumer mobile device 104 includes a cellular antenna, and the consumer mobile device 104 can use triangulation (e.g., using channel scans and comparing relative signal strengths, etc.) to compute its location. In other implementations, a consumer mobile device 104 and/or a PTV 106 can include an accelerometer, gyroscope, proximity sensor, light-level sensor, and/or any other suitable sensors by which to collect, improve, verify, and/or otherwise obtain location data.

Embodiments of the location characterization processor 120 can be in communication with the location capture device 110 and can compute a set of parked location attributes in accordance with the location data. The location characterization processor 120 can implement any suitable type of processing by which to compute the parked location attributes, depending on the types of location data obtained by the one or more sensors of the location capture device 110. In some embodiments, the location characterization processor 120 derives, from one or more images captured by the location capture device 110, some or all of the parked location attributes using image processing components, such as statistical image analysis, machine learning algorithms, artificial neural network processing, etc. In some embodiments, the location characterization processor 120 computes some or all of the parked location attributes by combining data obtained with multiple sensors. For example, the computed parked location attributes can indicate any desired information about the PTV 106 and/or its surrounding environment, such as a parked status of the PTV 106 (e.g., whether it is not moving), an orientation status of the PTV 106 (e.g., whether it is upright), a sheltered status of the PTV 106 (e.g., whether it is parked indoors or outdoors; under a tunnel, awning, overhang, bridge, or other covering; etc.), an obstruction status of the PTV 106 and/or its parked location (e.g., how much clearance is left around one or more sides of the parked PTV 106, whether there are any nearby obstructions, etc.), an accessibility status of the PTV 106 (e.g., whether it is parked in a publicly accessible location), an operability status of the PTV 106 (e.g., whether maintenance is needed, there is a flat tire, the PTV 106 is excessively dirty, etc.), a chargeability status of the PTV 106 and/or its parked location (e.g., whether a power system of a motorized PTV 106 needs to be charged, whether there is a charging infrastructure nearby, whether the PTV 106 is electrically connected to a charging infrastructure, whether light is shining on a solar panel of the PTV 106).

Some embodiments of the location characterization processor 120 can provide additional features relating to characterizing the parked location. In some embodiments, the location characterization processor 120 audits images collected by the location capture device 110 to determine whether the images are sufficient to derive information desired by the location characterization processor 120. In some such embodiments, the location characterization processor 120 can direct capturing of additional images by the location characterization processor 120, or the like. In other embodiments, the location characterization processor 120 can use additional information to augment, or otherwise impact how the location data obtained by the location capture device 110 is used to compute the parked location attributes. In some such embodiments, the location characterization processor 120 can compare location data obtained by one or more sensors of the location capture device 110 with map data (e.g., stored in a local data store, retrieved via the Internet or another network, etc.) to determine additional information about a derived location. For example, geospatial data, images, and/or other location data can be used by the location characterization processor 120 to compute that the PTV 106 is parked at a particular set of coordinates; and additional information accessible to the location characterization processor 120 can indicate, based on the particular set of coordinates, that the PTV 106 is parked outside in a public park (e.g., based on map data), the PTV 106 is parked in a relatively low-crime and high-traffic area (e.g., based on demographic data), it is a sunny day (e.g., based on weather data), etc.

Embodiments of the parking arbitration processor 130 can be in communication with the location characterization processor 120 and can compute an arbitration determination indicating whether the set of parked location attributes meets a set of acceptance criteria 137. The acceptance criteria 137 can be stored by the data store 135. The data store can include suitable data storage components, such as one or more non-transient, machine-readable media that may be in one location or distributed across multiple locations (e.g., as cloud-based storage). The acceptance criteria 137 can include any predetermined set of criteria for which an automated objective determination can be made to determine whether the PTV 106 is parked in an acceptable location. In some embodiments, the goal of the acceptance criteria 137 is to support a binary type of decision (e.g., the parked location is acceptable or unacceptable). In other embodiments, the goal of the acceptance criteria 137 is to support computation of an acceptability score for the parked location (e.g., indicating that the parked location falls somewhere on a spectrum between unacceptable to most acceptable, or that the parked location exhibits some degree of some number of acceptance criteria 137, etc.). In some implementations, the acceptance criteria 137 includes one or more regulatory (e.g., legal) driven criteria. For example, some regulations can prohibit or discourage parking of a PTV 106 in a manner that blocks other vehicle travel; other regulations can prohibit or discourage parking of a PTV 106 in a manner that blocks building doorways, fire hydrants, or emergency vehicle access; and other regulations (e.g., the Americans with Disabilities Act (ADA), etc.) can prohibit or discourage parking of a PTV 106 in a manner that blocks pedestrian zones (e.g., the Americans with Disabilities Act (ADA) requires at least five feet of clearance around a PTV 106 parked on a sidewalk).

Embodiments of the parking arbitration processor 130 can compute the arbitration determination in any suitable manner in accordance with the acceptance criteria 137 and the parked location attributes. In some embodiments, the parked location attributes are computed by the location characterization processor 120 in such a way that they can be directly compared to the acceptance criteria 137 by the parking arbitration processor 130. Such a comparison can indicate which of one or more acceptance criteria 137 are met, to what extent one or more acceptance criteria 137 are met, etc. In other embodiments, computing the arbitration determination can involve computing a decision for each of multiple acceptance criteria 137 (e.g., for each acceptance criterion 137, determining whether, and/or to what extent, the criterion is met), and combining the individual determinations into a final determination (e.g., by tallying the results, by computing a weighted sum of the results, etc.).

Embodiments of the lock control processor 140 communicate lock control data for a vehicle lock coupled with the PTV 106 in response to the arbitration determination indicating that the set of parked location attributes meets the set of acceptance criteria. For example, if the parking arbitration processor 130 determines that the parked location is acceptable, the lock control processor 140 can automatically lock, or facilitate locking by the consumer 102 of, the PTV 106 in its parked location. In some embodiments, the vehicle lock is an electrical lock that can be remotely locked by transmitting a code to the lock. In some such embodiments, the lock control data can be communicated directly to the vehicle lock (e.g., by the back-end computational system(s) 108 via a narrow-band network 154), thereby remotely locking the vehicle lock in response to the determination of the parking arbitration processor 130. In other such embodiments, the lock control data is an electronic code (e.g., a single-use code) sent to the consumer mobile device 104 of the consumer 102 checking in the PTV 106, and the consumer mobile device 104 can be used to transmit the lock control data to the vehicle lock to lock the PTV 106 (e.g., via a short-range network 152). In other such embodiments, the lock control data is a code (e.g., a single-use combination) sent to the consumer mobile device 104 of the consumer 102 checking in the PTV 106, the consumer mobile device 104 can be used to display the code to the consumer 102, and the consumer 102 can manually enter the code at the vehicle lock to lock the PTV 106 (e.g., via a short-range network 152). In other such embodiments, the consumer 102 can have a personal code (e.g., as part of the consumer's 102 account information, as described below), and communication of the lock control data can involve permitting the consumer's 102 personal code to be used for locking the vehicle lock. For example, in response to the arbitration determination, the vehicle lock can automatically by configured to accept the personal code for the next five minutes. As another example, the communicated lock control data can be computed as a function of the personal code of the consumer 102 (e.g., by computing a hash function using the personal code and a public key, or any other suitable data). As another example, the vehicle lock can generate and issue a code when the customer 102 checks out the PTV 106, and the code can be used to lock the PTV 106 only after receiving a favorable arbitration determination (e.g., and only that one time).

Some embodiments of the dockless PTV usage tracking system 105 include the account processor 160. Embodiments of the account processor 160 have access to account data 139, which can be stored by the data store 135, or in any other suitable location. The account processor 160 can handle any functionality relating to a consumer's 102 account, such as identifying a consumer 102 as part of a check-in request, handling payment transactions, computing payment amounts, updating consumer 102 profile information, etc. In some embodiments, the account processor 160 receives a PTV 106 check-in request indicating a request from a requesting consumer 102 to park the PTV 106 (the PTV 106 was previously checked out, or otherwise released, to the requesting consumer 102). In some such embodiments, the location capture device 110 may obtain the location data in connection with the request (e.g., in response to issuing the request, the customer 102 may be presented with a prompt to take or upload particular images; or one or more nodes may automatically obtain desired location data, such as a GPS location or images, in response to the request being issued). Further, the location may be characterized by the location characterization processor 120 and/or the arbitration determination may be computed by the parking arbitration processor 130 responsive to the request. The lock control data can also be communicated by the lock control processor 140 responsive to the request (e.g., assuming a favorable arbitration determination). In response to a favorable arbitration determination by the parking arbitration processor 130, embodiments of the account processor 160 can close out the transaction. Closing out the transaction can involve, for example, updating a PTV 106 inventory system to indicate that the PTV 106 is checked in and available for use (e.g., or in need of maintenance, or in some other state), updating the consumer's 102 account data 139 to indicate that the consumer 102 has successfully completed the transaction, etc.

In some embodiments, updating the account data 139 for the consumer 102 can involve simply closing out any related payment transactions (e.g., by debiting a pre-paid account, by processing a transaction with an on-file payment account, etc.). In other embodiments, updating the account data 139 for the consumer 102 can involve computing a payment amount in accordance with the arbitration determination and/or one or more of the acceptance criteria 137. In some such embodiments, the amount charged to a consumer 102 for use of the PTV 106 can depend on distance traveled, energy or fuel used (e.g., in a motorized PTV 106), etc. As another example, the amount charged to a consumer can depend on an acceptance score computed as part of the arbitration determination. As one set of examples, a consumer 102 may be charged extra as a disincentive or penalty for undesirable parking behavior, such as when the consumer 102 parks the PTV 106 in a manner that blocks other vehicle travel, building doorways, fire hydrants, emergency vehicle access, pedestrian zones, etc. As another set of examples, a consumer 102 may be charged extra for leaving the PTV 106 in a poor orientation (e.g., leaving a bicycle or scooter laying down, rather than upright), in a dangerous or unsanitary location (e.g., on very muddy ground), outside a desired radius from the check-out location, etc. Alternatively, in some such embodiments, a consumer 102 may be charged less (or may receive other types of incentives) to encourage desired parking behavior, such as when the consumer 102 parks the PTV 106 in an area with a large number of potential subsequent consumers (e.g., in an urban, high commuter traffic area), in a desired environmental condition (e.g., in the sun for a solar-powered PTV 106, in the shade for a PTV 106 likely to get too hot to ride comfortably otherwise, out of the rain on a rainy day, etc.), in a desired recharging location (e.g., plugged into a charging infrastructure for a rechargeable, battery-powered PTV 106), in a desired orientation (e.g., upright with a kickstand), in a low crime area, in a low vehicle traffic area, etc.

Figure 2A:
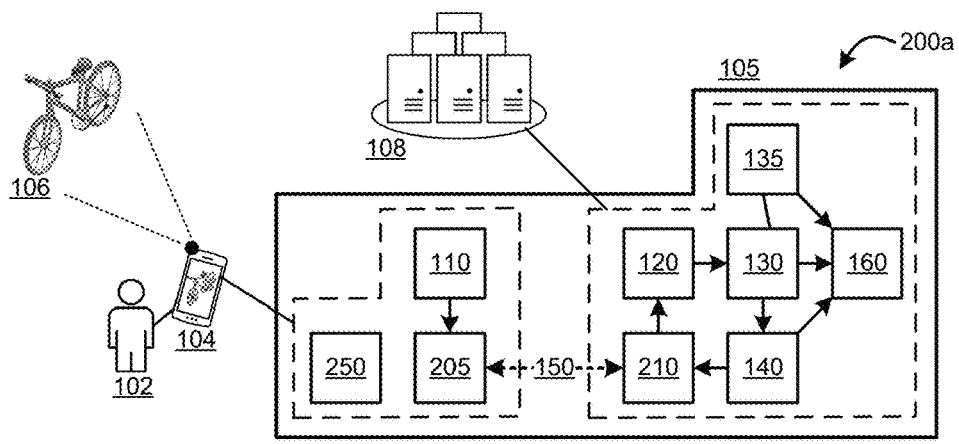
FIGS. 2A-2C illustrate three examples of implementations of a dockless PTV usage tracking system with components distributed across nodes of a networked usage tracking environment in different ways, according to various embodiments.
Figure 2B:
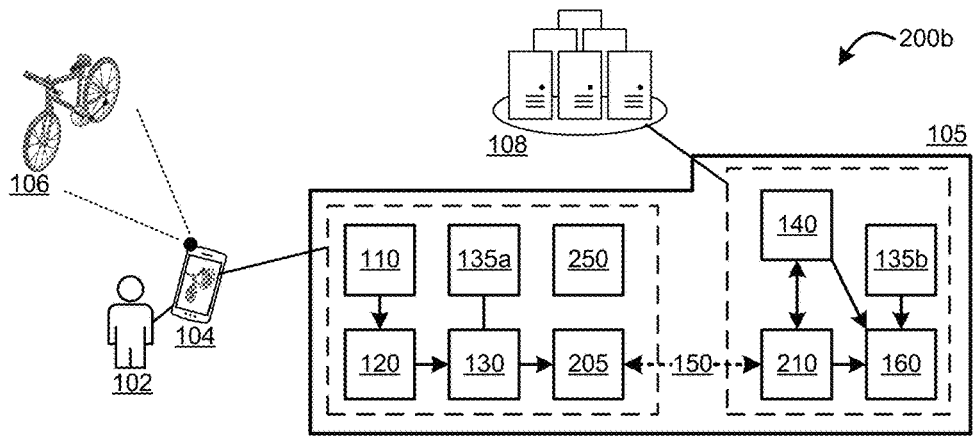
Figure 2C:
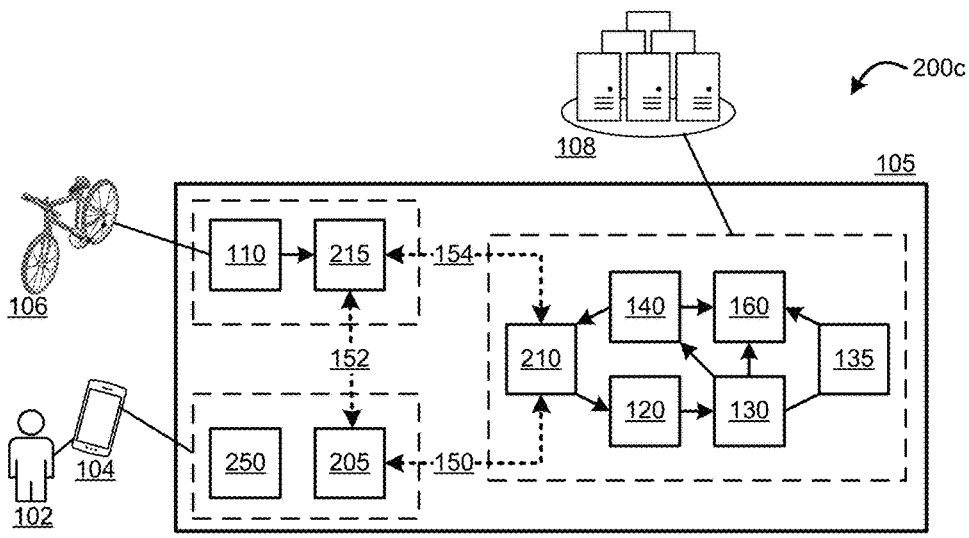

The various components of the dockless PTV usage tracking system 105 can be implemented in any suitable node of the networked usage tracking environment 100; and their particular functionality may differ, accordingly. FIGS. 2A-2C illustrate three examples of implementations of a dockless PTV usage tracking system 105 with components distributed across nodes of a networked usage tracking environment 200 in different ways, according to various embodiments. The three examples are only intended to illustrate some of the possible implementations, and should not be construed as limiting other implementations. Each networked usage tracking environment 200 can be an implementation of the networked usage tracking environment 100 of FIG. 1. To avoid overcomplicating the illustration, only a single back-end computational system 108, a single consumer mobile device 104, and a single PTV 106 is shown as part of each networked usage tracking environment 200; though it will be appreciated that, in practice, each networked usage tracking environment 200 would include at least multiple consumer mobile devices 104 and multiple PTVs 106. Accordingly, it can be assumed that in an implementation having multiple of a particular node (e.g., multiple consumer mobile devices 104, multiple PTVs 106, and/or multiple back-end computational systems 108), each instance of the node can include respective instances of the components assigned to that node.

Turning first to FIG. 2A, the dockless PTV usage tracking system 105 is implemented by a first architecture of the networked usage tracking environment 200a in such a way that the back-end computational system(s) 108 performs the bulk of the processing involved in check-in transactions for PTVs 106. As illustrated, the consumer mobile device 104 implements the location capture device 110, and the back-end computational system(s) 108 implement the location characterization processor 120, the parking arbitration processor 130, the data store 135, the lock control processor 140, and the account processor 160. For example, the consumer mobile device 104 has a processor 250 that executes an application associated with a dockless PTV 106 service. Using that application, the consumer 102 can initiate a check-in request for a PTV 106 that is currently checked out to the consumer 102. As part of the check-in request, the consumer 102 can use the location capture device 110 (e.g., a camera of the consumer mobile device 104, and/or other sensors) to obtain location data for the PTV 106 in its parked location. The obtained location data can be communicated over communications network(s) 150 to the back-end computational system(s) 108. For example, the consumer mobile device 104 includes a consumer network interface subsystem 205 that can include an antenna, protocol processors, transceivers, and/or any other suitable components for communicating via the communications network(s) 150. The back-end computational system(s) 108 can similarly include a provider network interface subsystem 210 that can include any other suitable components for communicating via the communications network(s) 150.

The provider network interface subsystem 210 of the back-end computational system(s) 108 can receive the location data via the communications network(s) 150, and can pass the data to the location characterization processor 120. As described herein, the location characterization processor 120 can compute parked location attributes and provide the parked location attributes to the parking arbitration processor 130; the parking arbitration processor 130 can use the parked location attributes to compute an arbitration determination and can provide the arbitration determination to the lock control processor 140 and/or to the account processor 160. In response, the lock control processor 140 can communicate lock control data back to the consumer mobile device 104 (e.g., via the provider network interface subsystem 210, the communications network(s) 150, and the consumer network interface subsystem 205). The consumer 102 can then use the received lock control data to lock a vehicle lock of the PTV 106 (e.g., by displaying a code for manual entry to the vehicle lock, by providing an electronic code that can be transmitted wirelessly to the vehicle lock from the consumer mobile device 104, or in any other suitable manner). In some embodiments, the account processor 160 can update account information of the consumer 102 to reflect the completed transaction (e.g., by computing a payment, processing a payment, etc.).

Turning to FIG. 2B, the dockless PTV usage tracking system 105 is implemented by a second architecture of the networked usage tracking environment 200b in such a way that the consumer mobile device 104 performs the bulk of the processing involved in check-in transactions for PTVs 106. As illustrated, the consumer mobile device 104 implements the location capture device 110, the location characterization processor 120, the parking arbitration processor 130, and a first portion of the data store 135a; and the back-end computational system(s) 108 implement the lock control processor 140, the account processor 160, and a second portion of the data store 135b. For example, the consumer mobile device 104 has a processor 250 that executes an application associated with a dockless PTV 106 service. Using that application, the consumer 102 can initiate a check-in request for a PTV 106 that is currently checked out to the consumer 102. As part of the check-in request, the consumer 102 can use the location capture device 110 to obtain location data for the PTV 106 in its parked location and can provide the location data to the location characterization processor 120. The location characterization processor 120 can compute parked location attributes from the location data and can provide the parked location attributes to the parking arbitration processor 130; and the parking arbitration processor 130 can use the parked location attributes to compute an arbitration determination. The computed arbitration determination can be communicated over communications network(s) 150 to the back-end computational system(s) 108 (e.g., via a consumer network interface subsystem 205 of the consumer mobile device 104 and a provider network interface subsystem 210 of the back-end computational system(s) 108.

The provider network interface subsystem 210 of the back-end computational system(s) 108 can receive the arbitration determination via the communications network(s) 150, and can provide the determination to the lock control processor 140 and/or to the account processor 160. In response, the lock control processor 140 can communicate lock control data back to the consumer mobile device 104 (e.g., via the provider network interface subsystem 210, the communications network(s) 150, and the consumer network interface subsystem 205), and/or the account processor 160 can update account information of the consumer 102 to reflect the completed transaction. As illustrated, the data store 135 can be distributed across the nodes. For example, each consumer mobile device 104 can have an instance of a first portion of the data store 135a having, stored thereon, a periodically updated set of acceptance criteria 137, local consumer 102 profile information (e.g., preferences, favorites, etc.), and/or other suitable information. The back-end computational system(s) 108 can have a second portion of the data store 135b having, stored thereon, account data 139, PTV 106 inventory information, and/or other suitable information.

Notably, either of FIG. 2A or 2B can be implemented without the PTV 106 having any connectivity capability (e.g., without the narrow-band networks 154 and the short-range networks 152). For example, all communications are over the communications network(s) 150 between the back-end computational system(s) 108 and the consumer mobile devices 104. Alternatively, either of FIG. 2A or 2B can be implemented with localized connectivity between the PTVs 106 and the consumer mobile devices 104 (e.g., with the short-range networks 152, for example, for communicating certain location data from a sensor of the PTV 106 to a location capture device 110 of the consumer mobile device 104, for providing lock control data from the consumer mobile device 104 to a vehicle lock of the PTV 106, etc.), but without any connectivity between the PTVs 106 and the back-end computational system(s) 108 (e.g., without the narrow-band networks 154). In contrast, FIG. 2C shows an implementation having PTVs 106 with additional connectivity capability.

In FIG. 2C, the dockless PTV usage tracking system 105 is implemented by a third architecture of the networked usage tracking environment 200c having various connectivity options between the PTVs 106, consumer mobile devices 104, and back-end computational system(s) 108. As illustrated, the PTV 106 can include a PTV network interface subsystem 215 having any suitable components for communicating with one or more networks, such as with the narrow-band networks 154 and/or the short-range networks 152. In some embodiments, the PTV 106 can communicate with the consumer mobile device 104 via the PTV network interface subsystem 215, the short-range networks 152, and the consumer network interface subsystem 205 (e.g., the consumer network interface subsystem 205 includes components for communicating with both the communications network(s) 150 and the short-range networks 152). In some embodiments, the PTV 106 can communicate with the back-end computational system(s) 108 via the PTV network interface subsystem 215, the narrow-band networks 154, and the provider network interface subsystem 210 (e.g., the provider network interface subsystem 210 includes components for communicating with both the communications network(s) 150 and the narrow-band networks 154).

The PTV 106 can implement the location capture device 110 to obtain some or all of the location data. For example, the PTV 106 has one or more integrated sensors, cameras, etc. The PTV 106 can provide the location data to the consumer mobile device 104 via the short-range networks 152 (e.g., using NFC, Bluetooth, etc.). Alternatively, the PTV 106 can provide the location data to the consumer mobile device 104 via the back-end computational system(s) 108 (e.g., from the PTV 106 to the back-end computational system(s) 108 via a narrow-band network 154, and from the back-end computational system(s) 108 to the consumer mobile device 104 via the communications network(s) 150, bypassing any short-range networks 152). In some implementations, the consumer mobile device 104 also includes a location capture device 110 to obtain additional location data. The location data obtained by the PTV 106 and/or the consumer mobile device 104 can be provided to the back-end computational system(s) 108 in any suitable manner. For example, the location data can be provided from the PTV 106 directly to the back-end computational system(s) 108 via the narrow-band networks 154; from the PTV 106 indirectly to the back-end computational system(s) 108 via the short-range networks 152, the consumer mobile device 104, and the communications network(s) 150; from the consumer mobile device 104 directly to the back-end computational system(s) 108 via the communications network(s) 150; or from the consumer mobile device 104 indirectly to the back-end computational system(s) 108 via the short-range networks 152, the PTV 106, and the narrow-band networks 154. The determination of the communication path can depend on any of a number of factors, such as availability of one or more of the networks (e.g., communications can preferably be from the PTV 106 to the back-end computational system(s) 108, but communication capabilities of the consumer mobile device 104 can be exploited if the narrow-band networks 154 are unavailable, or if the PTV 106 is out of range), capacity of one or more of the networks (e.g., images can be communicated via the communications network(s) 150, while coordinate data communicated be sent via the narrow-band networks 154), data type (e.g., account and request data can be communicated via the communications network(s) 150, while lock control data and inventory tracking data can be communicated via the narrow-band networks 154), etc.

In the illustrated configuration of FIG. 2C, upon receiving the location data, the provider network interface subsystem 210 of the back-end computational system(s) 108 can provide the data to the location characterization processor 120. The location characterization processor 120 can compute parked location attributes and provide the parked location attributes to the parking arbitration processor 130; the parking arbitration processor 130 can use the parked location attributes to compute an arbitration determination and can provide the arbitration determination to the lock control processor 140 and/or to the account processor 160. In response, the lock control processor 140 can communicate lock control data back to the consumer mobile device 104 and/or directly to the PTV 106 (e.g., the vehicle lock of the PTV 106 can be coupled with the PTV network interface subsystem 215), and/or the account processor 160 can update account information of the consumer 102 to reflect the completed transaction. In other implementations, the processing can be more similar to what is illustrated in FIG. 2B. For example, rather than providing the location data to the back-end computational system(s) 108, the consumer mobile device 104 can use a local instance of the location characterization processor 120 to compute parked location attributes from the location data and can provide the parked location attributes to a local instance of the parking arbitration processor 130; and the local instance of the parking arbitration processor 130 can use the parked location attributes to compute an arbitration determination. The computed arbitration determination can be communicated over communications network(s) 150 to the back-end computational system(s) 108, which can, in response to the determination, use the lock control processor 140 to communicate lock control data back to the consumer mobile device 104, and/or use the account processor 160 to update account information of the consumer 102 to reflect the completed transaction.

Figure 3:
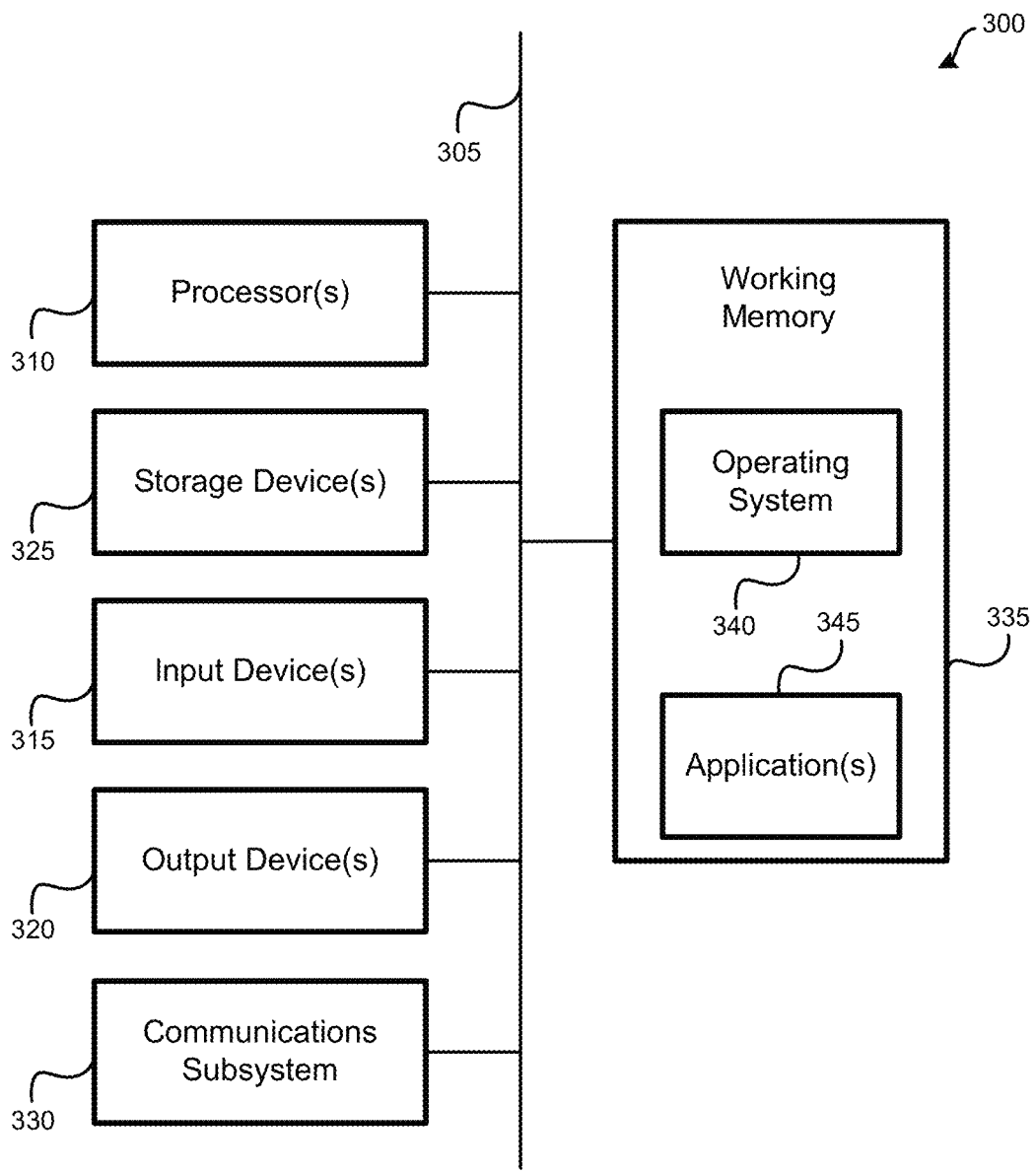
FIG. 3 provides a schematic illustration of one embodiment of a computer system that can perform various steps of the methods provided by various embodiments.

Embodiments of the dockless PTV usage tracking system 105, or components thereof, can be implemented on, and/or can incorporate, one or more computer systems, as illustrated in FIG. 3. FIG. 3 provides a schematic illustration of one embodiment of a computer system 300 that can perform various steps of the methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, and/or the like; and one or more output devices 320, which can include, without limitation, a display device, a printer, and/or the like.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 300 can also include a communications subsystem 330, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 330 may permit data to be exchanged with a network (such as the various networks described herein), other computer systems, and/or any other devices described herein. In many embodiments, the computer system 300 will further include a working memory 335, which can include a RAM or ROM device, as described herein.

The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

In some embodiments, the computer system 300 implements a usage tracking system for shared dockless PTVs, as described herein, in accordance with instructions stored in working memory 335 and executable by the processor(s) 310. Such instructions can include instructions to obtain location data from at least one sensor indicating a parked location of a PTV of a fleet of shared PTVs, to compute a set of parked location attributes in accordance with the location data, to compute an arbitration determination indicating whether the set of parked location attributes meets a stored set of acceptance criteria, and to output lock control data for a vehicle lock coupled with the personal transport vehicle in response to the arbitration determination indicating that the set of parked location attributes meets the set of acceptance criteria. As described herein, the computer system 300 can be distributed across one or more consumer mobile devices, back-end computational systems, and/or PTVs, in any suitable manner. In some implementations, the processor(s) 310 and the memory 335 are disposed in a back-end computational system communicatively coupled, via one or more communications networks, with a plurality of consumer mobile devices and a plurality of PTVs. In such an implementation, the instructions can cause the processor(s) 310 to: obtain the location data by receiving the location data, via the one or more communications networks, from one of the plurality of consumer mobile devices and/or from one of the plurality of PTVs; and output the lock control data by communicating the lock control data, via the one or more communications networks, to the one of the plurality of consumer mobile devices and/or to the one of the plurality of PTVs. In other implementations, the processor(s) 310 and the memory 335 are disposed in a consumer mobile device communicatively coupled with a back-end computational system via a communications network. In such an implementation, the instructions can cause the processor(s) 310 to: obtain the location data via one or more sensors of the consumer mobile device; and output the lock control data by receiving the lock control data a back-end computational system via a communications network.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
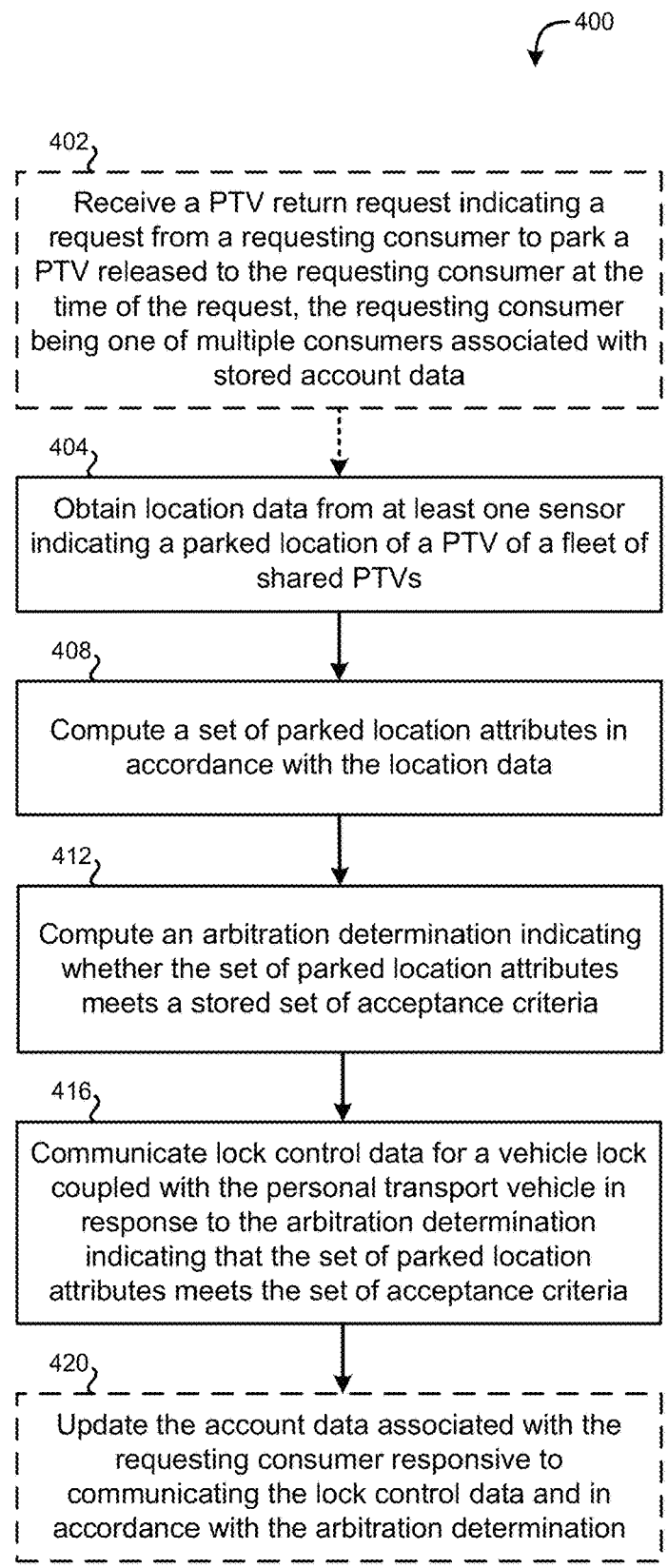
FIG. 4 shows a flow diagram of an illustrative method for usage tracking for shared dockless PTVs, according to various embodiments.

Systems including those described above can be used to implement various methods 400. FIG. 4 shows a flow diagram of an illustrative method 400 for usage tracking for shared dockless PTVs, according to various embodiments. Some embodiments of the method 400 begin at stage 404 by obtaining location data from at least one sensor indicating a parked location of a PTV of a fleet of shared PTVs. The location data can include any suitable location data obtained by any suitable sensor(s), such images (e.g., from a camera of a consumer mobile device and/or of the PTV), geospatial data (e.g., from a GPS sensor of a consumer mobile device and/or of the PTV), timing data (e.g., current time of day, time since the PTV was released to the current consumer, etc.), power availability (e.g., availability of sunlight for solar charging, availability of a charge port for grid charging, etc.), etc.

At stage 408, embodiments can compute a set of parked location attributes in accordance with the location data. In some implementations, the obtaining at stage 404 includes capturing at least one image of the PTV in the parked location (e.g., including image content of the immediate surrounding area) by a camera of a consumer mobile device, and the computing at stage 408 includes image processing the at least one image to compute at least a portion of the set of parked location attributes. The image processing can include automated feature recognition (e.g., using artificial neural network, machine learning, statistical processing, and/or other techniques) to determine attributes about the parked location. In other implementations, the obtaining at stage 404 includes capturing geospatial data, such as from a GPS sensor or by an antenna to triangulate with network towers, and the computing at stage 408 includes image mapping the geospatial data to a particular coordinate system or other geospatial reference. The various techniques for computing at stage 408 can reveal different types of parked location attributes. As one example, the image processing can indicate an amount of clearance left on a sidewalk around a PTV that is parked on a sidewalk, whether the PTV is parked in an upright position, whether there is visible damage to the PTV, etc. As another example, the image or geospatial data processing can indicate whether the PTV is parked outdoors, in a high-traffic area, in a neighborhood with a low occurrence of theft and property damage, etc.

At stage 412, embodiments can compute an arbitration determination indicating whether the set of parked location attributes meets a stored set of acceptance criteria. Different types of parked location attributes computed in stage 408 can be analyzed according to different types of acceptance criteria for the computation in stage 412. As one example, image processing as part of the computation of stage 408 can indicate an amount of clearance left on a sidewalk around a PTV that is parked on a sidewalk, and the acceptance criteria used in the computation of stage 412 can indicate that proper PTV parking requires leaving five feet of clearance around the PTV for compliance with the Americans with Disabilities Act (ADA). As another example, geospatial data processing as part of the computation of stage 408 can indicate the geospatial location at which the PTV is parked, and the acceptance criteria used in the computation of stage 412 can indicate that proper PTV parking requires the consumer to park the PTV outdoors within a particular radius from where the PTV was released to the consumer.

At stage 416, embodiments can communicate lock control data for a vehicle lock coupled with the personal transport vehicle in response to the arbitration determination indicating that the set of parked location attributes meets the set of acceptance criteria. In some implementations, the vehicle lock is a combination lock, and the lock control data is a combination communicated for display to a consumer via a consumer mobile device. In such an implementation, manually entering the combination into the vehicle lock by the consumer can cause the vehicle to be locked (e.g., thereby checking the PTV back in and ending the consumer's transaction). In other implementations, the vehicle lock is an electronically controllable lock, and the lock control data is an electronic locking code communicated to the vehicle lock from a back-end server, via a consumer mobile device (e.g., using short-range wireless communications), or in any other suitable manner. In such an implementation, the vehicle lock can automatically lock in response to receipt of the lock control data.

Some embodiments of the method 400 begin at stage 402 by receiving a PTV check-in request indicating a request from a requesting consumer (e.g., via a smart phone application, or the like) to park the PTV. In such cases, the PTV is one that was previously released to the requesting consumer, such that it is released at the time when the request is received. The requesting consumer can be one of multiple consumers associated with stored account data. In some such embodiments, the location data can be obtained at stage 404 in connection with the request (e.g., as part of the request, in response to a prompt issued in response to the request, or in any other suitable manner), the arbitration determination can be computed at stage 412 responsive to the request, and the lock control data can be communicated at stage 416 responsive to the request. In some such embodiments, the method 400 further includes, at stage 420, updating the account data associated with the requesting consumer responsive to communicating the lock control data and in accordance with the arbitration determination.

As described herein, steps of the method 400 can be performed by any suitable component at any suitable node of a network environment. In one implementation, the obtaining at stage 404 includes receiving the location data by a back-end computational system from a consumer mobile device via a communications network, the computing at stages 408 and 412 are performed by the back-end computational system, and the communicating at stage 416 is by the back-end computational system to the consumer mobile device via the communications network. In another implementation, the obtaining at stage 404 includes receiving the location data by a back-end computational system from a communications device of the PTV via a narrow-band communications network, the computing at stages 408 and 412 are performed by the back-end computational system, and the communicating at stage 416 is by the back-end computational system to the communications device of the PTV via the narrow-band communications network. In another implementation, the obtaining at stage 404 includes receiving the location data by at least one sensor of a consumer mobile device, the computing at stage 408 is performed by the consumer mobile device, the computing at stage 412 is performed by the consumer mobile device and includes transmitting the arbitration determination to a back-end computational system via a communications network, and the communicating at stage 416 is by the back-end computational system.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for usage tracking of a fleet of shared, dockless, two-wheel personal transport vehicles (PTVs), the system comprising:
   a location capture device to obtain location data from at least one sensor indicating at least a parked location of a two-wheel PTV of the fleet as not corresponding to a previously approved parking location, the location data obtained in connection with receiving a check-in request for the two-wheel PTV while the two-wheel PTV is presently checked out to a consumer;
   a location characterization processor in communication with the location capture device to determine a set of parked location attributes in accordance with the location data;
   a parking arbitration processor in communication with the location characterization processor to:
      compute an individual determination, for each acceptance criterion of a stored set of acceptance criteria defined at least by one or more regulations, of a respective amount of compatibility between the set of parked location attributes and the acceptance criterion;
      compute an acceptability score based on combining the individual determinations; and
      compute an arbitration determination indicating whether to grant the check-in request for the two-wheel PTV based on the acceptability score, such that checking in the PTV causes the PTV to be available for subsequent check-out as part of the fleet of shared, dockless, two-wheel PTVs.

2. The system of claim 1, further comprising:
   a non-transient data store having the set of acceptance criteria stored thereon.

3. The system of claim 1, further comprising:
   an account processor in communication with the parking arbitration processor to compute, responsive to the arbitration determination indicating to grant the check-in request for the two-wheel PTV, a payment amount to charge to the consumer for use of the two-wheel PTV prior to the check-in request, the payment amount computed based at least on the acceptability score.

4. The system of claim 3, wherein the account processor is to compute the payment amount by:
   computing a first payment amount based on a usage amount associated with use of the two-wheel PTV while checked out to the consumer; and
   computing an second payment amount as a disincentive penalty based on the acceptability score indicating incompatibility between the set of parked location attributes and the stored set of acceptance criteria,
   the payment amount being computed as at least the first payment amount plus the second payment amount.

5. The system of claim 3, wherein the account processor is to compute the payment amount by:
   computing a first payment amount based on a usage amount associated with use of the two-wheel PTV while checked out to the consumer; and
   computing a second payment amount as an incentive based on the acceptability score indicating compatibility between the set of parked location attributes and the stored set of acceptance criteria,
   the payment amount being computed as at least the first payment amount minus the second payment amount.

6. The system of claim 1, wherein the parking arbitration processor is further to:
   direct communicating of a message to the consumer, responsive to the arbitration determination indicating not to grant the check-in request for the two-wheel PTV, the message indicating the failure to check in the two-wheel PTV, such that the two-wheel PTV remains checked out to the consumer.

7. The system of claim 1, wherein:
   the location capture device is to obtain the location data from the at least one sensor to include an image of the two-wheel PTV in the parked location;
   the location characterization processor is to determine the set of parked location attributes by image processing the at least one image to obtain information characterizing an environment surrounding the PTV in the parked location and/or a state of the PTV in the parked location; and
   the parking arbitration processor is to compute the acceptability score is based at least on the information characterizing the environment surrounding the PTV in the parked location and/or the state of the PTV in the parked location.

8. The system of claim 1, further comprising:
   a lock control processor in communication with the parking arbitration processor to direct communicating, to a mobile device of the consumer, responsive to the arbitration determination indicating to grant the check-in request for the two-wheel PTV, lock control data usable by the consumer to lock a vehicle lock integrated with the two-wheel PTV.

9. The system of claim 1, wherein:
   at least a portion of the system is disposed in a back-end computational system in communication with the two-wheel PTV and with a mobile device of the consumer via one or more communication networks comprising a narrow-band network.

10. A method comprising:
    receiving a check-in request for a two-wheel personal transport vehicles (PTV) of a fleet of shared, dockless, two-wheel PTVs while the two-wheel PTV is presently checked out to a consumer;
    obtaining location data from at least one sensor indicating at least a parked location of the two-wheel PTV as not corresponding to a previously approved parking location;
    determining a set of parked location attributes based on the location data;
    computing an individual determination, for each acceptance criterion of a stored set of acceptance criteria defined at least by one or more regulations, of a respective amount of compatibility between the set of parked location attributes and the acceptance criterion;
    computing an acceptability score based on combining the individual determinations; and
    computing an arbitration determination indicating whether to grant the check-in request for the two-wheel PTV based on the acceptability score, such that checking in the PTV causes the PTV to be available for subsequent check-out as part of the fleet of shared, dockless, two-wheel PTVs.

11. The method of claim 10, further comprising:
computing, responsive to the arbitration determination indicating to grant the check-in request for the two-wheel PTV, a payment amount to charge to the consumer for use of the two-wheel PTV prior to the check-in request, the payment amount computed based at least on the acceptability score.

12. The method of claim 11, wherein the computing the payment amount comprises:
computing a first payment amount based on a usage amount associated with use of the two-wheel PTV while checked out to the consumer; and
computing an second payment amount as a disincentive penalty based on the acceptability score indicating incompatibility between the set of parked location attributes and the stored set of acceptance criteria,
the payment amount being computed as at least the first payment amount plus the second payment amount.

13. The method of claim 11, wherein the computing the payment amount comprises:
computing a first payment amount based on a usage amount associated with use of the two-wheel PTV while checked out to the consumer; and
computing a second payment amount as an incentive based on the acceptability score indicating compatibility between the set of parked location attributes and the stored set of acceptance criteria,
the payment amount being computed as at least the first payment amount minus the second payment amount.

14. The method of claim 10, further comprising:
communicating a message to the consumer, responsive to the arbitration determination indicating not to grant the check-in request for the two-wheel PTV, the message indicating the failure to check in the two-wheel PTV, such that the two-wheel PTV remains checked out to the consumer.

15. The method of claim 10, wherein:
the obtaining the location data from the at least one sensor comprises obtaining an image of the two-wheel PTV in the parked location;
the determining the set of parked location attributes comprises image processing the at least one image to obtain information characterizing an environment surrounding the PTV in the parked location and/or a state of the PTV in the parked location; and
the computing the acceptability score is based at least on the information characterizing the environment surrounding the PTV in the parked location and/or the state of the PTV in the parked location.

16. The method of claim 10, wherein:
the receiving the check-in request is by a back-end computational system from a mobile device of the consumer; and
the obtaining the location data is by the back-end computational system from the at least one sensor, the at least one sensor being integrated with the two-wheel PTV.

17. The method of claim 10, wherein the receiving the check-in request is by a back-end computational system from a mobile device of the consumer, and further comprising:
communicating, from the back-end computational system to the mobile device of the consumer, responsive to the arbitration determination indicating to grant the check-in request for the two-wheel PTV, lock control data usable by the consumer to lock a vehicle lock integrated with the two-wheel PTV.

18. A back-end computational system comprising:
one or more processors; and
a non-transient memory having instructions stored thereon, which, when executed, cause the one or more processors to perform steps comprising:
receiving a check-in request for a two-wheel personal transport vehicles (PTV) of a fleet of shared, dockless, two-wheel PTVs while the two-wheel PTV is presently checked out to a consumer;
obtaining location data from at least one sensor indicating at least a parked location of the two-wheel PTV as not corresponding to a previously approved parking location;
determining a set of parked location attributes based on the location data;
computing an individual determination, for each acceptance criterion of a stored set of acceptance criteria defined at least by one or more regulations, of a respective amount of compatibility between the set of parked location attributes and the acceptance criterion;
computing an acceptability score based on combining the individual determinations; and
computing an arbitration determination indicating whether to grant the check-in request for the two-wheel PTV based on the acceptability score, such that checking in the PTV causes the PTV to be available for subsequent check-out as part of the fleet of shared, dockless, two-wheel PTVs.

* * * * *